United States Patent
Mori

(10) Patent No.: US 9,258,552 B2
(45) Date of Patent: **\*Feb. 9, 2016**

(54) PLAYBACK DEVICE, COMPOUND-EYE IMAGE PICKUP DEVICE, PLAYBACK METHOD AND NON-TRANSITORY COMPUTER READABLE MEDIUM

(71) Applicant: FUJIFILM Corporation, Tokyo (JP)

(72) Inventor: Koji Mori, Kurokawa-gun (JP)

(73) Assignee: FUJIFILM Corporation, Tokyo (JP)

( \* ) Notice: Subject to any disclaimer, the term of this patent is extended or adjusted under 35 U.S.C. 154(b) by 263 days.

This patent is subject to a terminal disclaimer.

(21) Appl. No.: 13/727,288

(22) Filed: Dec. 26, 2012

(65) Prior Publication Data

US 2013/0113901 A1    May 9, 2013

Related U.S. Application Data

(63) Continuation of application No. PCT/JP2011/059112, filed on Apr. 12, 2011.

(30) Foreign Application Priority Data

Jun. 30, 2010 (JP) .................................. 2010-149859

(51) Int. Cl.
*H04N 13/04* (2006.01)
*G03B 35/16* (2006.01)
(Continued)

(52) U.S. Cl.
CPC ............ *H04N 13/0425* (2013.01); *G03B 35/16* (2013.01); *G03B 35/24* (2013.01); *H04N 13/0018* (2013.01); *H04N 13/0022* (2013.01); *H04N 13/0232* (2013.01)

(58) Field of Classification Search
None
See application file for complete search history.

(56) References Cited

U.S. PATENT DOCUMENTS 4,736,247 A \* 4/1988 Graham .................. G01S 17/48
348/139
2004/0057612 A1    3/2004 Tabata
(Continued)

FOREIGN PATENT DOCUMENTS

| JP | H10-40420 A | 2/1998 |
|---|---|---|
| JP | 11-355808 A | 12/1999 |

(Continued)

OTHER PUBLICATIONS

International Preliminary Report on Patentability issued in International Application No. PCT/JP2011/059112.
(Continued)

*Primary Examiner* — Sath V Perungavoor
*Assistant Examiner* — Dakshesh Parikh
(74) *Attorney, Agent, or Firm* — Birch, Stewart, Kolasch & Birch, LLP

(57) ABSTRACT

There is provided: a CPU that, in at least one case among a case in which fluctuation of a fixed interval in the acquired parallax amount is greater than a predetermined value, and a case in which the parallax amount reaches a predetermined allowed limit value, or a case in which an object of acquisition of the parallax amount can no longer be detected, judges that there is an abnormality in the parallax amount, and that, in a case that is none of these, judges that there is no abnormality in the parallax amount, and that, when it is judged that there is no abnormality in the parallax amount, carries out first parallax adjustment, and that, when it is judged that there is an abnormality in the parallax amount, switches to control of a second parallax adjustment and carries out parallax adjustment.

8 Claims, 17 Drawing Sheets

(51) Int. Cl.
   *G03B 35/24*    (2006.01)
   *H04N 13/00*    (2006.01)
   *H04N 13/02*    (2006.01)

(56) References Cited

U.S. PATENT DOCUMENTS

| | | | |
|---|---|---|---|
| 2004/0208357 A1 | 10/2004 | Tokuhashi et al. | |
| 2005/0031330 A1* | 2/2005 | Nonaka | G03B 13/36 396/104 |
| 2005/0253924 A1* | 11/2005 | Mashitani | H04N 13/0275 348/42 |
| 2007/0296874 A1* | 12/2007 | Yoshimoto | G09G 3/003 348/739 |

FOREIGN PATENT DOCUMENTS

| | | |
|---|---|---|
| JP | 2003-18619 A | 1/2003 |
| JP | 2004-221700 A | 8/2004 |
| JP | 2005-73012 A | 3/2005 |
| JP | 2008-92515 A | 4/2008 |

OTHER PUBLICATIONS

International Search Report issued in International Application No. PCT/JP2011/059112 mailed Jul. 12, 2011.
Chinese Office Action, dated Sep. 1, 2014, for Chinese Application No. 201180031764.1, including a partial English translation.
Chinese Office Action issued Sep. 16, 2015 in corresponding Chinese Application No. 201180031764.1.

* cited by examiner

FIG.20

| | | |
|---|---|---|
| FIRST FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |
| SECOND FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |
| . . . | . . . | . . . |
| nTH FRAME | LEFT EYE IMAGE | COORDINATE GROUP OF CHARACTERISTIC POINT A |
| | | COORDINATE GROUP OF DETECTED FACE A |
| | | COORDINATE GROUP OF DETECTED FACE B |
| | | ABSENCE/PRESENCE OF HUNTING |
| | | . |
| | | . |
| | RIGHT EYE IMAGE | COORDINATE GROUP OF CHARACTERISTIC POINT A' |
| | | COORDINATE GROUP OF DETECTED FACE A' |
| | | COORDINATE GROUP OF DETECTED FACE B' |
| | | ABSENCE/PRESENCE OF HUNTING |
| | | . |
| | | . |

LEFT EYE IMAGE   DETECTED FACE A

CHARACTERISTIC POINT A   DETECTED FACE B

RIGHT EYE IMAGE   DETECTED FACE A'

CHARACTERISTIC POINT A'   DETECTED FACE B'

PLAYBACK DEVICE, COMPOUND-EYE IMAGE PICKUP DEVICE, PLAYBACK METHOD AND NON-TRANSITORY COMPUTER READABLE MEDIUM

CROSS-REFERENCE TO RELATED APPLICATION

This application is a continuation application of International Application No. PCT/JP2011/059112, filed Apr. 12, 2011, which is incorporated herein by reference. Further, this application claims priority from Japanese Patent Application No. 2010-149859, filed Jun. 30, 2010, which is incorporated herein by reference.

TECHNICAL FIELD

The present invention relates to a playback device, a compound-eye image pickup device, a playback method and a non-transitory computer readable medium.

BACKGROUND ART

There is conventionally proposed a compound-eye image pickup device that has plural image pickup sections and generates a stereoscopic image. The compound-eye image pickup device generates the stereoscopic image on the basis of plural viewpoint images that are generated by the plural image pickup sections respectively, and displays this stereoscopic image on a monitor for stereoscopic display.

The stereoscopic feel of the stereoscopic image that is picked-up at the compound-eye image pickup device depends on distance between the both eyes of the user and the distance from the monitor for stereoscopic display to the user, and therefore, there is the problem that, with regard to the stereoscopic function of the compound-eye image pickup device, differences between individuals are great. Thus, in a compound-eye image pickup device, the parallax of the plural viewpoint images can be adjusted in accordance with operation of the user, and the stereoscopic feel of the stereoscopic image is thereby adjusted.

Thus, in Japanese Patent Application Laid-Open No. 2005-73012 (hereinafter called Patent Document 1), there is disclosed a technique of carrying out parallax amount adjustment that suits the intentions of the user who carried out the parallax amount adjustment initially, regardless of the type of the display that displays the stereoscopic image.

In the technique of Patent Document 1, information relating to adjustment of the parallax amount is created on the basis of a request to change the parallax amount, and this is converted into information of a unit that does not depend on the type of the display, and is recorded. Then, when the recorded information is read-out, information relating to adjustment of the parallax amount is created on the basis of this information, and an image for stereoscopic display is generated on the basis of this information.

Further, in Japanese Patent Application Laid-Open No. 2004-221700 (hereinafter called Patent Document 2), there is disclosed a technique of specifying the parallax that suits the intentions of the user while the stereoscopic image is being displayed.

In the technique of Patent Document 2, the limit parallax of a stereoscopic image that was displayed on a display device is specified in accordance with the instruction of a user, and image processing is carried out so that the appropriate parallax is realized before the stereoscopic image is displayed.

However, when there are problems in the initial stage, e.g., when there are problems with the parallax amount itself that is determined from the plural viewpoint images obtained by the image pickup sections, or when the object of parallax adjustment can no longer be detected, there is the problem that parallax adjustment cannot be carried out appropriately even if the techniques of Patent Documents 1 and 2 are used.

The present invention is proposed in view of these circumstances, and an object thereof is to provide a playback device, a compound-eye image pickup device, a playback method and a non-transitory computer readable medium, that can carry out parallax adjustment appropriately even when there are problems with the parallax amount itself that is determined from plural viewpoint images or when the object of parallax adjustment can no longer be detected.

SUMMARY OF INVENTION

Solution to the Problem

A playback device relating to a first aspect of the present invention comprises: an input section that inputs continuous frame images of a plurality of viewpoints in which a same subject has been picked-up in continuous frames from a plurality of viewpoints; a parallax amount acquiring section that acquires a parallax amount on the basis of frame images that structure the continuous frame images inputted by the input section; an abnormality judging section that judges that there is an abnormality in the parallax amount in at least one case among a case in which fluctuation of a fixed interval in the parallax amount acquired by the parallax amount acquiring section is greater than a predetermined value, a case in which the parallax amount reaches an allowed limit value that has been determined in advance, or a case in which an object of acquisition of the parallax amount can no longer be detected; a parallax adjusting section that, when it is judged by the abnormality judging section that there is no abnormality in the parallax amount, carries out first parallax adjustment, and that, when it is judged by the abnormality judging section that there is an abnormality in the parallax amount, switches to control of a second parallax adjustment, that is different than control of the first parallax adjustment, and carries out parallax adjustment; and an output section that outputs the continuous frame images on which the parallax adjustment has been carried out by the parallax adjusting section.

In a second aspect of the present invention, in the first aspect of the present invention, when it is judged by the abnormality judging section that there is an abnormality in the parallax amount, the parallax adjusting section carries out parallax adjustment within a range of a parallax amount maximum change amount that has been determined in advance.

In a third aspect of the present invention, in the first aspect or the second aspect of the present invention, when it is judged by the abnormality judging section that there is an abnormality in the parallax amount, the parallax adjusting section carries out parallax adjustment by using a parallax amount of a previous frame.

In a fourth aspect of the present invention, in any one of the first aspect through the third aspect of the present invention, when it is judged by the abnormality judging section that there is an abnormality in the parallax amount, the parallax adjusting section lowers a parallax adjustment frequency.

In a fifth aspect of the present invention, in any one of the first aspect through the fourth aspect of the present invention, the parallax amount acquiring section acquires the parallax amount on the basis of a subject image that has been determined in advance as a subject image that is an object of acquisition of the parallax amount within the frame images.

In a sixth aspect of the present invention, in the fifth aspect of the present invention, the subject image that has been determined in advance is a subject image that is based on a closed curve region prescribed by a spatial frequency of a predetermined value within the frame images.

A seventh aspect of the present invention comprises: an input section that inputs continuous frame images of a plurality of viewpoints in which a same subject has been picked-up in continuous frames from a plurality of viewpoints; a parallax amount acquiring section that acquires a parallax amount of a predetermined object on the basis of frame images that structure the continuous frame images inputted by the input section; an abnormality judging section that judges that there is an abnormality in the parallax amount in at least one case among a case in which fluctuation of a fixed interval in the parallax amount acquired by the parallax amount acquiring section is greater than a predetermined value, a case in which the parallax amount reaches an allowed limit value that has been determined in advance, or a case in which an object of acquisition of the parallax amount can no longer be detected; a parallax adjusting section that, when it is judged by the abnormality judging section that there is no abnormality in the parallax amount, carries out parallax adjustment of the predetermined object, and that, when it is judged by the abnormality judging section that there is an abnormality in the parallax amount, carries out parallax adjustment with respect to another object that is different than the predetermined object; and an output section that, when it is judged by the abnormality judging section that there is no abnormality in the parallax amount, outputs the frame images that include the predetermined object on which parallax adjustment has been carried out by the parallax adjusting section, and that, when it is judged by the abnormality judging section that there is an abnormality in the parallax amount, outputs the frame images that include the other object on which parallax adjustment has been carried out by the parallax adjusting section.

In an eighth aspect of the present invention, in the seventh aspect of the present invention, the parallax adjusting section makes an object, that has a closest distance to the predetermined object in a direction orthogonal to an image plane of the frame images, be the other object.

In a ninth aspect of the present invention, in the seventh aspect of the present invention, the parallax adjusting section makes an object, that has a closest distance to the predetermined object in an image plane of the frame images, be the other object.

In a tenth aspect of the present invention, in any one of the seventh aspect through the ninth aspect of the present invention, at least one of the predetermined object o r the other object is a subject image that is based on a closed curve region prescribed by a spatial frequency of a predetermined value within the frame images.

In an eleventh aspect of the present invention, in any one of the first aspect through the tenth aspect of the present invention, there is further comprised a display section that displays the frame images, that are outputted by the output section, such that the frame images are viewed as a stereoscopic image.

A twelfth aspect of the present invention comprises: the playback device of any one of the first aspect through the eleventh aspect of the present invention; and an image pickup section that generates the continuous frame images by picking-up a same subject from a plurality of viewpoints in continuous frames.

A thirteenth aspect of the present invention: inputs continuous frame images of a plurality of viewpoints in which a same subject has been picked-up in continuous frames from a plurality of viewpoints; acquires a parallax amount on the basis of frame images that structure the inputted continuous frame images; judges that there is an abnormality in the parallax amount in at least one case among a case in which fluctuation of a fixed interval in the acquired parallax amount is greater than a predetermined value, a case in which the parallax amount reaches an allowed limit value that has been determined in advance, or a case in which an object of acquisition of the parallax amount can no longer be detected; when it is judged that there is no abnormality in the parallax amount, carries out first parallax adjustment, and, when it is judged that there is an abnormality in the parallax amount, switches to control of a second parallax adjustment, that is different than control of the first parallax adjustment, and carries out parallax adjustment; and outputs the continuous frame images on which the parallax adjustment has been carried out.

A fourteenth aspect of the present invention: inputs continuous frame images of a plurality of viewpoints in which a same subject has been picked-up in continuous frames from a plurality of viewpoints; acquires a parallax amount of a predetermined object on the basis of frame images that structure the inputted continuous frame images; judges that there is an abnormality in the parallax amount in at least one case among a case in which fluctuation of a fixed interval in the acquired parallax amount is greater than a predetermined value, a case in which the parallax amount reaches an allowed limit value that has been determined in advance, or a case in which an object of acquisition of the parallax amount can no longer be detected; when it is judged that there is no abnormality in the parallax amount, carries out parallax adjustment of the predetermined object, and, when it is judged that there is an abnormality in the parallax amount, carries out parallax adjustment with respect to another object that is different than the predetermined object; and when it is judged that there is no abnormality in the parallax amount, outputs the frame images that include the predetermined object on which the parallax adjustment has been carried out, and, when it is judged that there is an abnormality in the parallax amount, outputs the frame images that include the other object on which the parallax adjustment has been carried out.

A fifteenth aspect of the present invention is for causing a computer to function as: an input section that inputs continuous frame images of a plurality of viewpoints in which a same subject has been picked-up in continuous frames from a plurality of viewpoints; a parallax amount acquiring section that acquires a parallax amount on the basis of frame images that structure the continuous frame images inputted by the input section; an abnormality judging section that judges that there is an abnormality in the parallax amount in at least one case among a case in which fluctuation of a fixed interval in the parallax amount acquired by the parallax amount acquiring section is greater than a predetermined value, a case in which the parallax amount reaches an allowed limit value that has been determined in advance, or a case in which an object of acquisition of the parallax amount can no longer be detected; a parallax adjusting section that, when it is judged by the abnormality judging section that there is no abnormality in the parallax amount, carries out first parallax adjustment, and that, when it is judged by the abnormality judging section that there is an abnormality in the parallax amount, switches to control of a second parallax adjustment, that is different than control of the first parallax adjustment, and carries out parallax adjustment; and an output section that outputs the continuous frame images on which the parallax adjustment has been carried out by the parallax adjusting section.

A sixteenth aspect of the present invention is for causing a computer to function as: an input section that inputs continuous frame images of a plurality of viewpoints in which a same subject has been picked-up in continuous frames from a plurality of viewpoints; a parallax amount acquiring section that acquires a parallax amount of a predetermined object on the basis of frame images that structure the continuous frame images inputted by the input section; an abnormality judging section that judges that there is an abnormality in the parallax amount in at least one case among a case in which fluctuation of a fixed interval in the parallax amount acquired by the parallax amount acquiring section is greater than a predetermined value, a case in which the parallax amount reaches an allowed limit value that has been determined in advance, or a case in which an object of acquisition of the parallax amount can no longer be detected; a parallax adjusting section that, when it is judged by the abnormality judging section that there is no abnormality in the parallax amount, carries out parallax adjustment of the predetermined object, and that, when it is judged by the abnormality judging section that there is an abnormality in the parallax amount, carries out parallax adjustment with respect to another object that is different than the predetermined object; and an output section that, when it is judged by the abnormality judging section that there is no abnormality in the parallax amount, outputs the frame images that include the predetermined object on which parallax adjustment has been carried out by the parallax adjusting section, and that, when it is judged by the abnormality judging section that there is an abnormality in the parallax amount, outputs the frame images that include the other object on which parallax adjustment has been carried out by the parallax adjusting section.

Advantageous Effects of the Invention

In accordance with the present invention, parallax adjustment can be carried out appropriately even when there are problems with the parallax amount itself that is determined from plural viewpoint images or when the object of parallax adjustment can no longer be detected.

BRIEF DESCRIPTION OF DRAWINGS

FIG. 20 is a drawing showing an example of parallax related information.

DESCRIPTION OF EMBODIMENTS

First Embodiment

Figure 1:
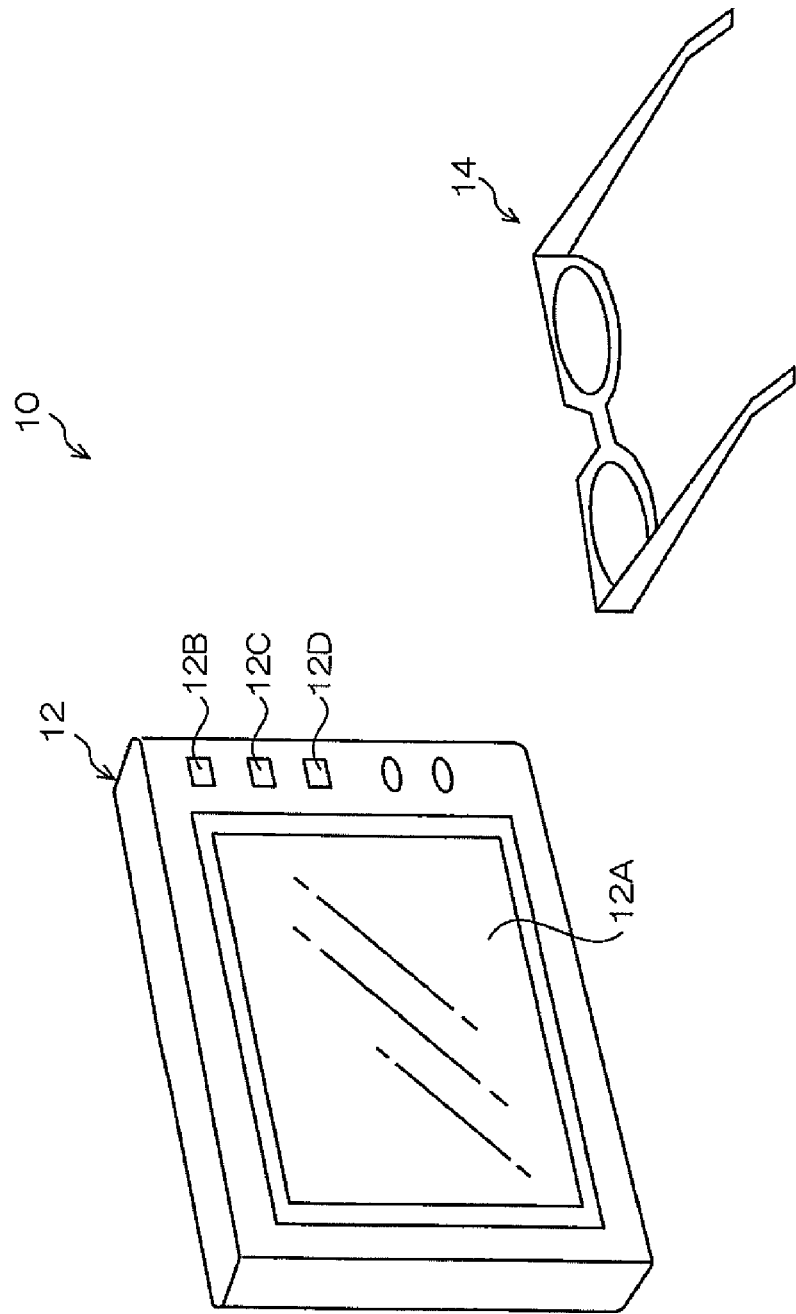
FIG. 1 is a perspective view showing a summary of a stereoscopic image playback device.

FIG. 1 is a drawing showing a summary of a stereoscopic image playback device 10 relating to a first embodiment of the present invention.

As shown in this drawing, the stereoscopic image playback device 10 relating to the present first embodiment has a display device 12 that displays stereoscopic images and liquid crystal shutter glasses 14. Further, the display device 12 has a monitor 12A that carries out various types of display, a power button 12B, a playback start button 12C, and a playback stop button 12D.

Note that, in the present first embodiment, description is given by using, as an example, a form in which a three-dimensional stereoscopic image is played-back so as to be seen as a stereoscopic image by a method in which an image G1 for the left eye and an image G2 for the right eye are displayed alternately on the display device 12, and liquid crystal shutters are driven alternately such that the right-eye liquid crystal shutter of the liquid crystal shutter glasses 14 is in a transmitting state when the image G1 for the left eye is displayed, and the left-eye liquid crystal shutter of the liquid crystal shutter glasses 14 is in a transmitting state when the image G2 for the right eye is displayed. Note that, in the present first embodiment, a stereoscopic image playback device, that plays back three-dimensional stereoscopic images by using the liquid crystal shutter glasses 14, is described as an example, but the present invention is not limited to this, and, for example, may be applied to a device that plays back three-dimensional stereoscopic images by using polarizing filter glasses, or may be applied to a stereoscopic image playback device of a method that plays back three-dimensional stereoscopic images by a method that does not utilize glasses.

Figure 2:
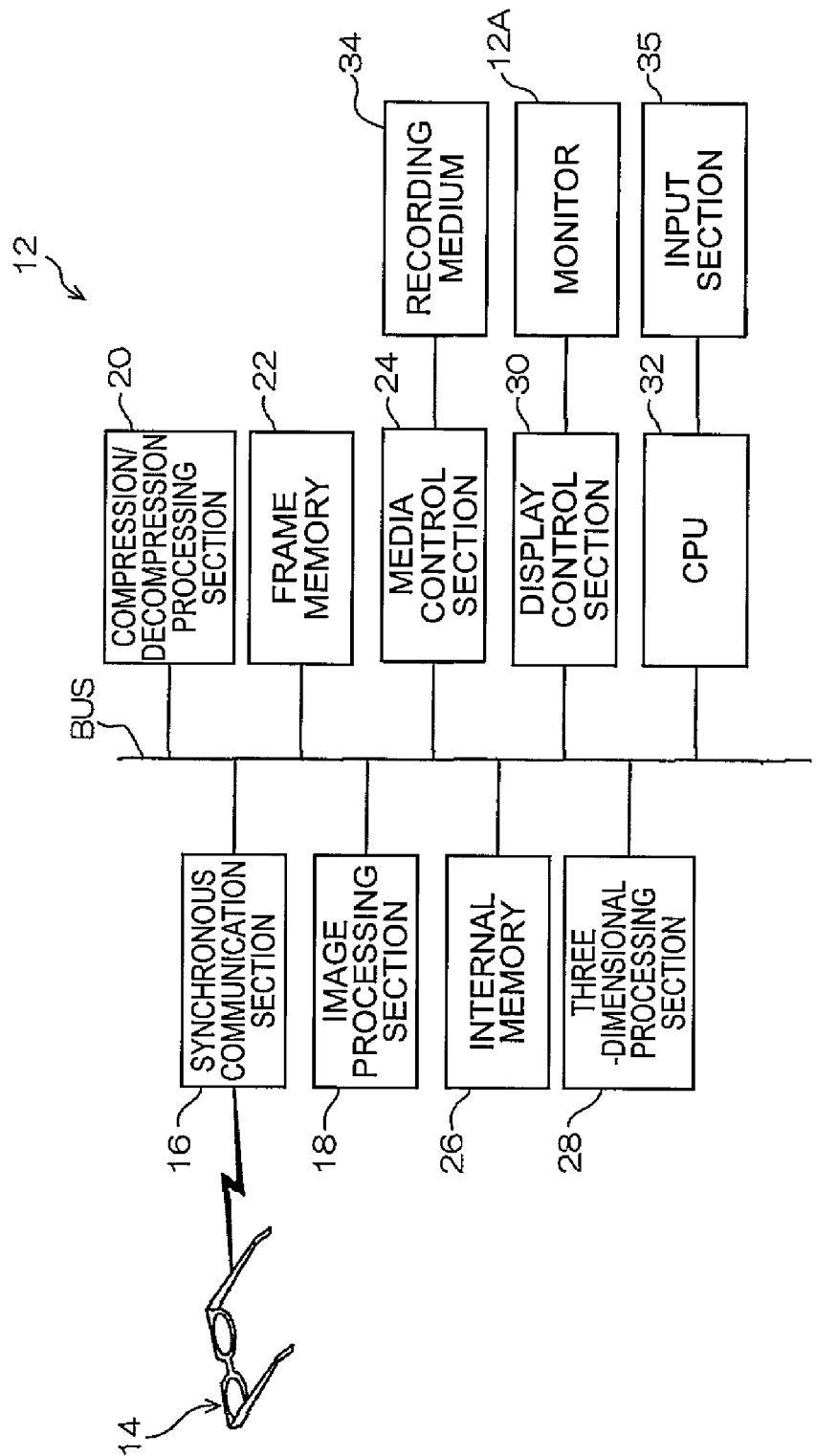
FIG. 2 is a block diagram showing the schematic structure of a display device side of the stereoscopic image playback device.

FIG. 2 is a block diagram showing the schematic structure of the display device 12 side of the stereoscopic image playback device 10 relating to the present first embodiment.

The display device 12 has a synchronous communication section 16, an image processing section 18, a compression/decompression processing section 20, a frame memory 22, a media control section 24, an internal memory 26, a three-dimensional processing section 28, a display control section 30, and a CPU 32. These are connected to one another via a bus BUS. Further, a recording medium 34 is connected to the media control section 24, and the monitor 12A is connected to the display control section 30, respectively. Moreover, an input section 35, that is structured to include the power button 12B, the playback start button 12C and the playback stop button 12D, is connected to the CPU 32.

The synchronous communication section 16 carries out transmission and receipt of signals for synchronizing driving of the left and right liquid crystal shutters of the liquid crystal shutter glasses 14, and the respective images for the left eye and the right eye that are displayed on the display device 12.

The image processing section 18 carries out various types of image processings, such as white balance adjustment, gradation correction, sharpness correction, color correction, and the like on the image data that expresses the image that is to be displayed.

The compression/decompression processing section 20 carries out compression processing in a compression format such as, for example, JPEG or MPEG or the like, on the image data subjected to processing by the image processing section 18, so as to generate an image file F0 for stereoscopic viewing, and, at the time of playback, carries out decompression processing on compressed image data. The image file F0 has the image data of the image G1 for the left eye and the image G2 for the right eye, and further includes accessory information that is based on Exif format for example, such as the baseline length, the convergence angle, the image capturing date and time and the like, and viewpoint information expressing the viewpoint positions.

Figure 3:
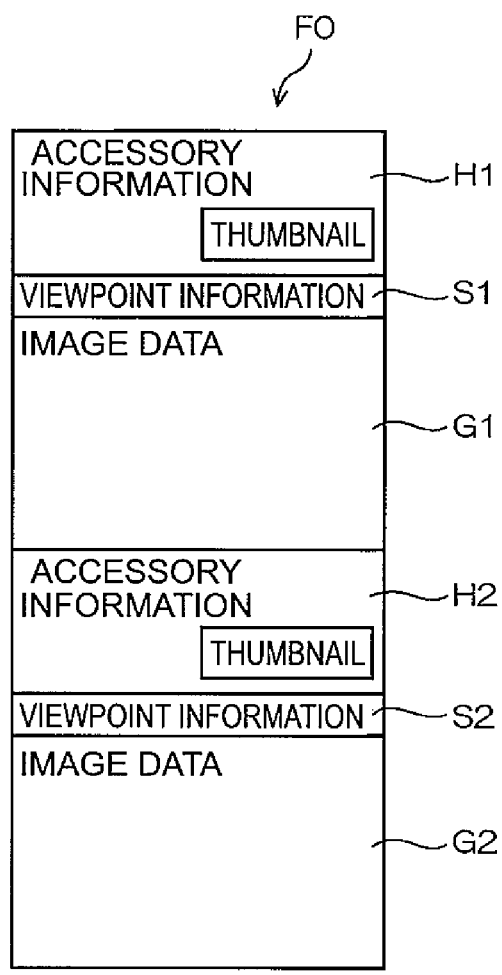
FIG. 3 is a drawing showing the file format of an image file for stereoscopic viewing.

FIG. 3 is a drawing showing the file format of the image file for stereoscopic viewing. Accessory information H1 of the image G1 for the left eye, viewpoint information S1 of the image G1 for the left eye, image data of the image G1 for the left eye, accessory information H2 of the image G2 for the right eye, viewpoint information S2 of the image G2 for the right eye, and image data of the image G2 for the right eye are stored in the image file F0 for stereoscopic viewing. Further, although not illustrated, information expressing the start position and the end position of the data are included before and after the accessory information, the viewpoint information and the image data of the images G1, G2 for the left eye and the right eye.

Information of the image capturing date, the baseline length, and the convergence angle of the images G1, G2 for the left eye and the right eye is included in the accessory information H1, H2. Thumbnail images of the images G1, G2 for the left eye and the right eye also are included in the accessory information H1, H2. Note that the number of the viewpoint position, that is given in order from the imaging section at the left side for example, can be used as the viewpoint information.

The frame memory 22 is a memory for work that is used at the time of carrying out various types of processings that carry out the processings that the image processing section 18 carries out, on the image data.

The media control section 24 carries out control of accessing the recording medium 34 and, for example, writing and reading image files.

The internal memory 26 stores, for example, information that expresses the various settings at the display device 12, and programs that the CPU 32 executes.

The three-dimensional processing section 28 reads-out the image data stored on the recording medium 34, and controls the display control section such that a stereoscopic image GR is displayed by alternately displaying the image G1 for the left eye and the image G2 for the right eye that are for displaying a stereoscopic image, synchronously with a synchronization signal that is obtained by the synchronous communication section 16 by communication with the liquid crystal shutter glasses 14. Further, when parallax information per frame is not recorded in the image data, the three-dimensional processing section 28 detects the main subject, and carries out processing that computes the parallax per frame. Further, the three-dimensional processing section 28 can also adjust the parallax of the image G1 for the left eye and the image G2 for the right eye. Here, parallax means the amount of offset of the pixel positions in the lateral direction of the image G1 for the left eye and the image G2 for the right eye, i.e., in the direction along the base line, of the subject that is included in both the image G1 for the left eye and the image G2 for the right eye. By adjusting the parallax, the stereoscopic feel of the subject that is included in the stereoscopic image GR can be made to be an appropriate feel.

In the case of stereoscopic viewing, the display control section 30 displays the image G1 for the left eye and the image G2 for the right eye alternately on the monitor 12A in accordance with control of the three-dimensional processing section 28.

Figure 4:
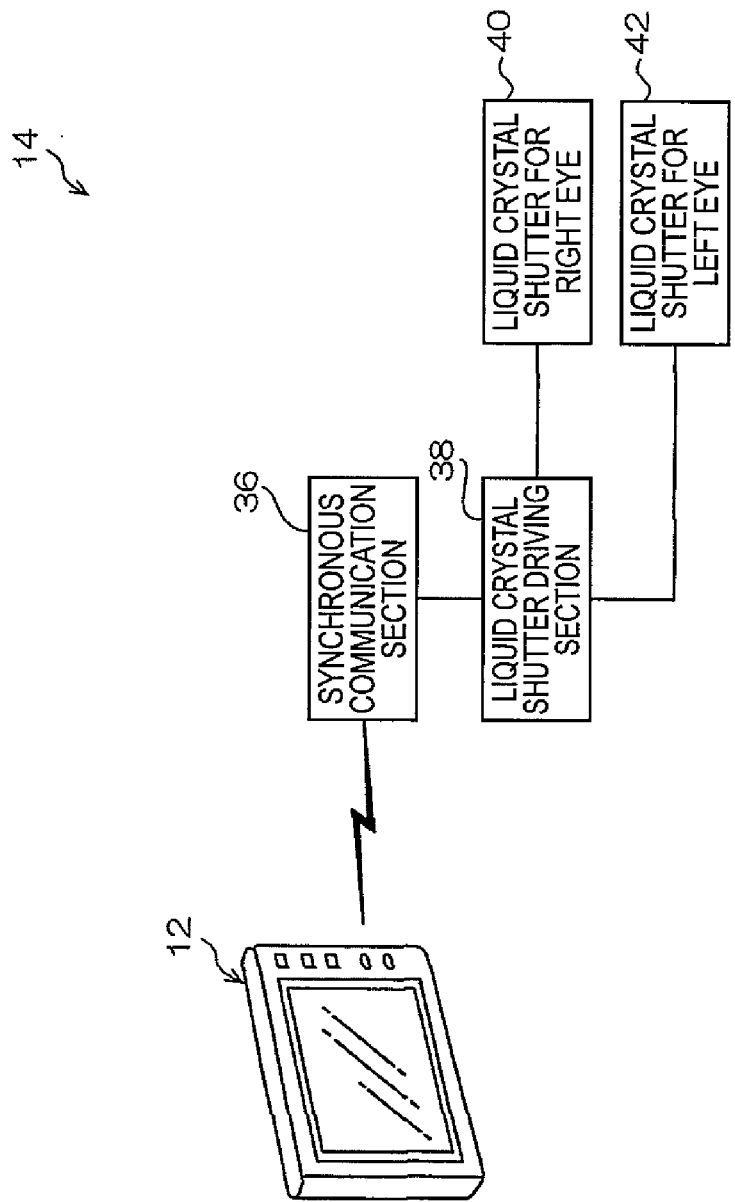
FIG. 4 is a block diagram showing the schematic structure of a liquid crystal shutter glasses side of the stereoscopic image playback device.

FIG. 4 is a block diagram showing the schematic structure at the liquid crystal shutter glasses 14 side of the stereoscopic image playback device 10 relating to the first embodiment.

The liquid crystal shutter glasses 14 have a synchronous communication section 36, a liquid crystal shutter driving section 38, a liquid crystal shutter 40 for the right eye, and a liquid crystal shutter 42 for the left eye.

The synchronous communication section 36 communicates signals for synchronizing the driving of the left and right liquid crystal shutters, and the respective left and right images that are displayed on the display device 12.

The liquid crystal shutter driving section 38 controls the driving of the liquid crystal shutter 40 for the right eye and the liquid crystal shutter 42 for the left eye, synchronously with a synchronization signal obtained by communication with the display device 12 by the synchronous communication section 36. Due thereto, when the image G1 for the left eye is being displayed on the monitor 12A of the display device 12, the liquid crystal shutter 40 for the right eye is in a transmitting state and the liquid crystal shutter 42 for the left eye is in a blocking state, and, when the image G2 for the right eye is being displayed on the monitor 12A of the display device 12, the liquid crystal shutter 42 for the left eye is in a transmitting state and the liquid crystal shutter 40 for the right eye is in a blocking state, and stereoscopic images are played-back.

The following first or second parallax adjusting routine is executed at the display device 12 that is structured as described above. Note that the programs of the first and second parallax adjusting routines are stored in advance in the internal memory 26.

(First Parallax Adjusting Routine)

Figure 5:
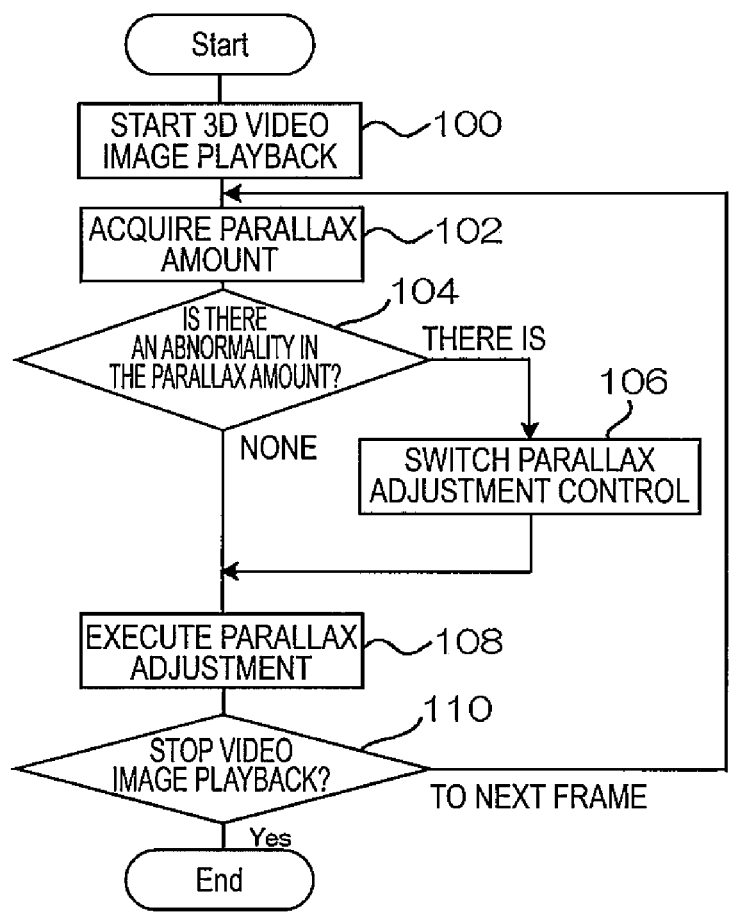
FIG. 5 is a flowchart showing a first parallax adjusting routine.

FIG. 5 is a flowchart showing the first parallax adjusting routine.

In step 100, when an instruction to start video image playback is inputted via the playback start button 12C, the CPU 32 starts three-dimensional video image playback, and the routine proceeds to step 102.

In step 102, the CPU 32 causes the three-dimensional processing section 28 to acquire a parallax amount that is based on the images G1, G2 for the left eye and the right eye of the image file F0 stored in the recording medium 34. Here, a first or second parallax amount acquiring routine is executed, and the three-dimensional processing section 30 carries out the following processing.

(Acquiring of Parallax Amount)

Figure 6:
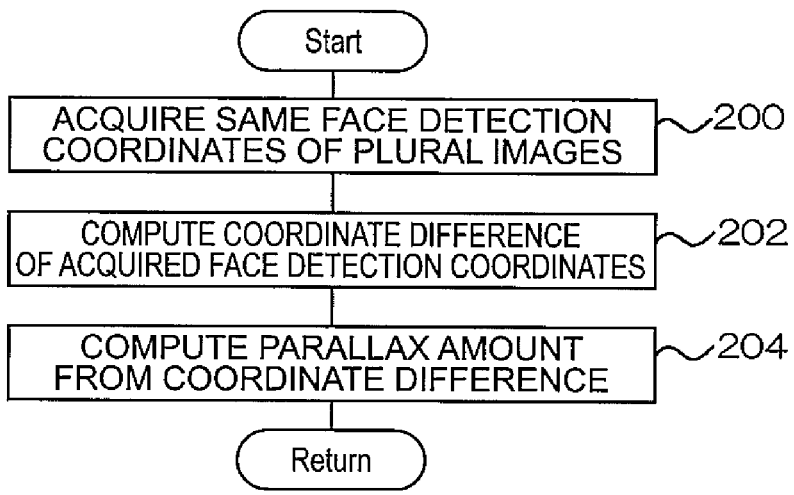
FIG. 6 is a flowchart showing a first parallax amount acquisition routine.

FIG. 6 is a flowchart showing the first parallax amount acquiring routine. Initially, the three-dimensional processing section 28 respectively detects the face region of a same person in plural images, i.e., the images G1, G2 for the left eye and the right eye of the image file F0 stored in the recording medium 34, and acquires face detection coordinates that express the coordinates of these face regions (step 200), and computes a coordinate difference of the acquired face detection coordinates (step 202), and computes a parallax amount from the coordinate difference (step 204).

Figure 7:
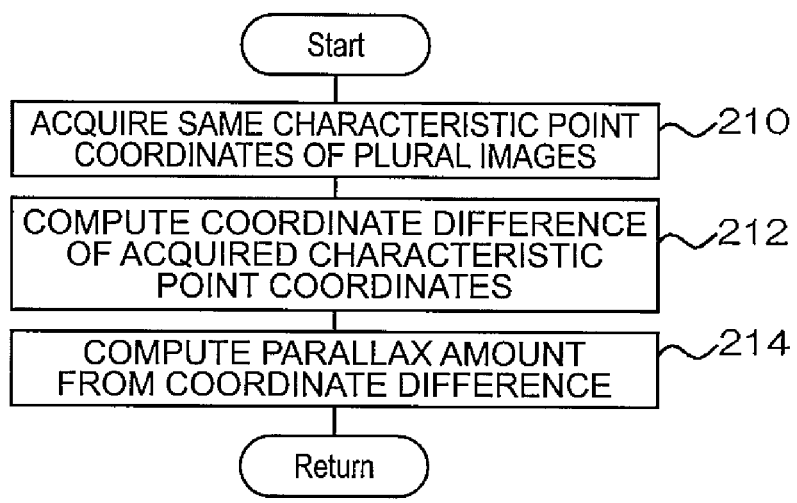
FIG. 7 is a flowchart showing a second parallax amount acquisition routine.

FIG. 7 is a flowchart showing the second parallax amount acquiring routine. Initially, the three-dimensional processing section 30 respectively detects a same object in plural images, i.e., the images G1, G2 for the left eye and the right eye of the image file F0 stored in the recording medium 34, and acquires characteristic point coordinates that are the coordinates of characteristic points that specify these objects (step 210), and computes the coordinate difference of the acquired characteristic point coordinates (step 212), and computes a parallax amount from the coordinate difference (step 214). Then, when the first or second parallax amount acquiring routine ends, the routine moves on to step 104 shown in FIG. 5.

(Judgment as to Abnormality of Parallax Amount)

In step 104, the CPU 32 judges whether or not there is an abnormality in the parallax amount acquired at the three-dimensional processing section 28. When it is judged that there is an abnormality, the routine proceeds to step 106, and when it is judged that there is no abnormality, the routine proceeds to step 108. Here, abnormality of the parallax amount is judged on the basis of any one of (1) whether or not there is hunting in the parallax amount, (2) whether the parallax amount is the allowed limit, and (3) whether the object of parallax adjustment has been lost track of and can no longer be detected.

(1) Judgment as to Absence/Presence of Hunting

In step 104, the CPU 32 executes a first or second hunting absence/presence judging routine that are shown next. Note that the programs for the left eye and of the second hunting absence/presence judging routine are stored in advance in the internal memory 26.

Figure 8:
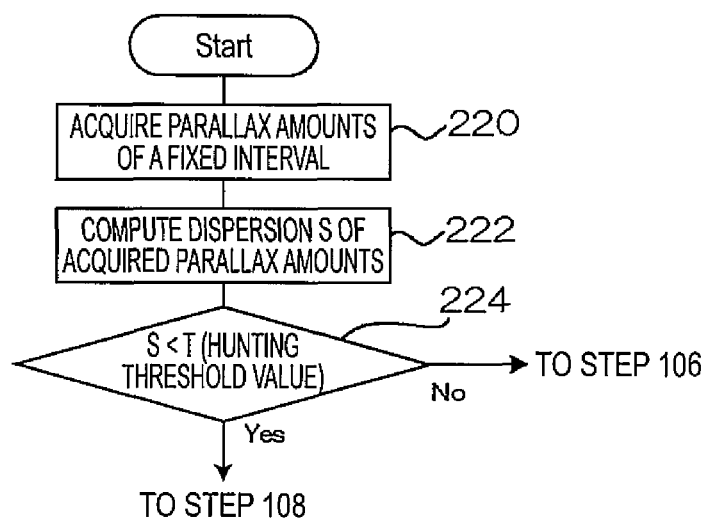
FIG. 8 is a flowchart showing a first hunting absence/presence judging routine.

FIG. 8 is a flowchart showing the first hunting absence/presence judging routine. The CPU 32 acquires parallax amounts of a fixed interval that are obtained at the three-dimensional processing section 28 (step 220), and computes dispersion S of the acquired parallax amounts (step 222). Then, the CPU 35 judges whether the dispersion S is smaller than a hunting threshold value T (S<T) (step 224). When S<T, it is judged that there is no hunting (there is no abnormality in the parallax amount), and the routine proceeds to step 108 of FIG. 5. When S is not <T, it is judged that there is hunting (there is an abnormality in the parallax amount), and the routine proceeds to step 106 of FIG. 5.

Figure 9:
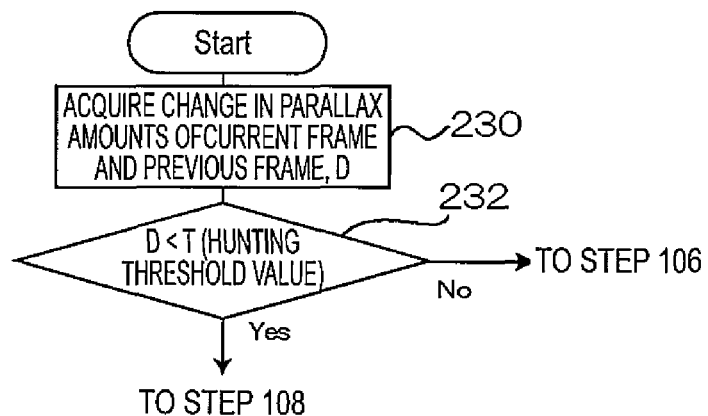
FIG. 9 is a flowchart showing a second hunting absence/presence judging routine.

FIG. 9 is a flowchart showing the second hunting absence/presence judging routine. The CPU 32 acquires a change amount D in the parallax amount of the current frame and the previous frame obtained at the three-dimensional processing section 28 (step 230). Then, the CPU 32 judges whether the change amount D is smaller than the hunting threshold value T (S<T) (step 232). When D<T, it is judged that there is no hunting (there is no abnormality in the parallax amount), and the routine proceeds to step 108 of FIG. 5. When D is not <T, it is judged that there is hunting (there is an abnormality in the parallax amount), and the routine proceeds to step 106 of FIG. 5.

(2) Judgment as to Allowed Limit of Parallax Amount

In step 104, the CPU 32 may judge whether the parallax amount has reached an allowed limit value that is set in advance. Here, the allowed limit means a threshold value of the parallax amount that indicates too much jumping-out or too much sinking-in of the object expressed by the stereoscopic image. When the parallax amount has reached the allowed limit value, the routine proceeds to step 106. When the parallax amount has not reached the allowed limit value, the routine proceeds to step 108.

(3) Judgment as to Object of Parallax Adjustment

In step 104, the CPU 32 may judge whether or not the object of parallax adjustment has been lost track of and can no longer be detected. An object or plural characteristic points or the like that are in the vicinity of the central position of the screen, such as, for example, the face of a person or the like, corresponds to the object of parallax adjustment.

Here, when the object of parallax adjustment has not been detected in 10 frames for example, the CPU 32 judges that the object of parallax adjustment has been lost track of, and the routine proceeds to step 106. When the object of parallax adjustment is not detected in 10 frames, the routine proceeds to step 108. Note that "10 frames" is merely an example, and another number of frames may be used. Due thereto, when the object of parallax adjustment is lost track of, the parallax adjustment control is switched, and therefore, parallax adjustment of three-dimensional video image playback can be stabilized.

(Switching of Parallax Adjustment Control)

In step 106, the CPU 32 switches the parallax adjustment control to another control. Here, any one processing among first through third switching processings is executed.

As the first switching processing, the CPU 32 limits the amount of change in the parallax amount per frame by defining a parallax amount maximum change amount per frame and setting it at the three-dimensional processing section 28. Due thereto, parallax adjustment is carried out within the range of the parallax amount maximum change amount, and sudden changes in the parallax amount can be suppressed, and therefore, parallax adjustment of three-dimensional video image playback can be stabilized.

Further, as the second switching processing, the CPU 32 skips parallax adjustment at the frame in question (prohibits parallax adjustment at the frame in question), and continues the parallax adjustment of the previous frame as is. Namely, the parallax amount at the previous frame is used. Due thereto, even when there is an abnormality in the parallax amount, because parallax adjustment can be skipped, parallax adjustment of three-dimensional video image playback can be stabilized.

Figure 10:
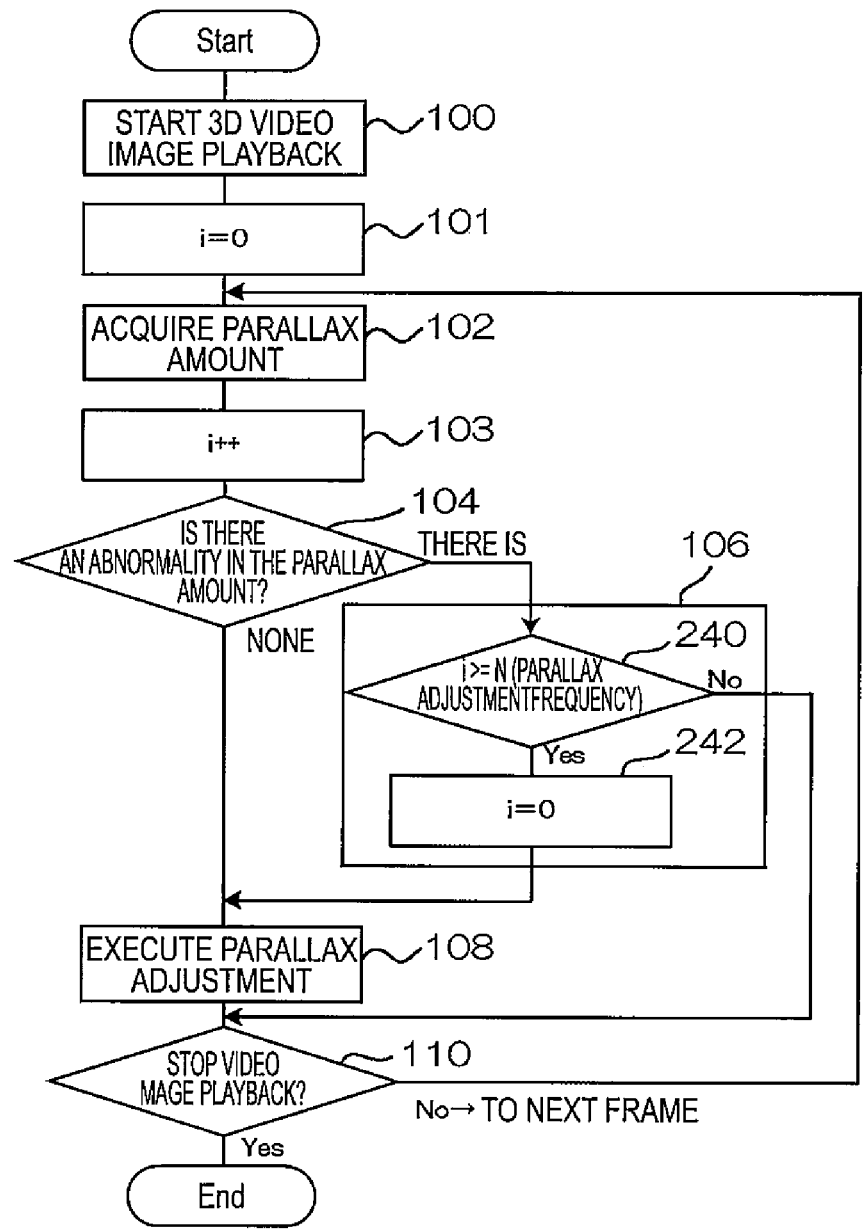
FIG. 10 is a flowchart showing a second parallax adjusting routine.

Moreover, as the third switching processing, the CPU 32 reduces the frequency of executing parallax adjustment. Here, the second parallax adjusting routine shown in following FIG. 10 is executed instead of the parallax adjusting routine shown in FIG. 5. Note that steps that are the same as steps of FIG. 5 are denoted by the same reference numerals, and repeat description is omitted.

The parallax adjusting routine of FIG. 10 differs from FIG. 5 with regard to the point that index number i is set to i=0 after step 100 (step 101), and i is incremented by 1 (i++) after step 102 (step 103). Further, in step 106 in which the third switching processing is carried out, the following processing is carried out.

First, the CPU 32 judges whether the index number i is greater than or equal to parallax adjustment frequency N (i≥N) (step 240). Then, when i≥N, the CPU 32 sets i=0 (step 242), and proceeds to step 108. When i is not ≥N, the CPU 32 skips step 108 and proceeds to step 110.

Therefore, when the index number i is less than N, steps 102, 103, 104, 106 (step 240), 110 are executed repeatedly, and parallax adjustment (step 108) is not carried out. Further, when the index number i reaches N, the routine proceeds to step 108 through steps 104, 106 (steps 240, 242), and therefore, parallax adjustment is executed.

Accordingly, when there is an abnormality in the parallax, the parallax is adjusted one time each N frames, and the parallax is not adjusted each frame. Therefore, the frequency of parallax adjustment is reduced, and changes in the parallax adjustment can be made to be gentle.

In step 108, the CPU 32 causes the three-dimensional processing section 28 to execute parallax adjustment, and outputs the images G1, G2 for the left eye and the right eye, whose parallax has been adjusted, to the display control section 30, and proceeds to step 110.

In step 110, the CPU 32 judges whether an instruction to stop video image playback has been inputted from the playback stop button 12D. When the judgment is affirmative, the CPU 32 ends the present routine. When the judgment is negative, the CPU 32 shifts to processing of the next frame, and returns to step 102 again.

As described above, even when there is an abnormality in the parallax amount or when the parallax object has been lost track of, the stereoscopic image playback device 10 relating to the present first embodiment carries out parallax adjustment after switching the parallax adjustment control. Therefore, parallax adjustment of three-dimensional video image playback can be stabilized.

Note that, when the CPU 32 detects hunting, the CPU 32 may, after executing parallax adjustment (after step 108 ends), record, in the recording medium 34, hunting information that expresses the absence/presence of hunting. Due thereto, because the absence/presence of hunting is added to the video image information, the CPU 32 can utilize the hunting information at times of video playback again, and parallax adjustment at the time of three-dimensional video playback again can be stabilized. Further, a case is described in which, in step 104, any one of (1) judgment as to the absence/presence of hunting, (2) judgment as to the allowed limit of the parallax amount, and (3) judgment as to the object of parallax adjustment, is executed, but it suffices for at least one of (1) through (3) to be executed. Moreover, a case is described in which, in step 106, any one processing among the first through third switching processings is executed, but it suffices for at least one processing among the first through third switching processings to be executed.

Second Embodiment

A second embodiment of the present invention is described next. Note that regions that are the same as the first embodiment are denoted by the same reference numerals, and detailed description thereof is omitted. In the first embodiment, the first or second parallax adjusting routine is executed, but, in the second embodiment, the following third parallax adjusting routine is executed instead of the first or second parallax adjusting routine.

(Third Parallax Adjusting Routine)

Figure 11:
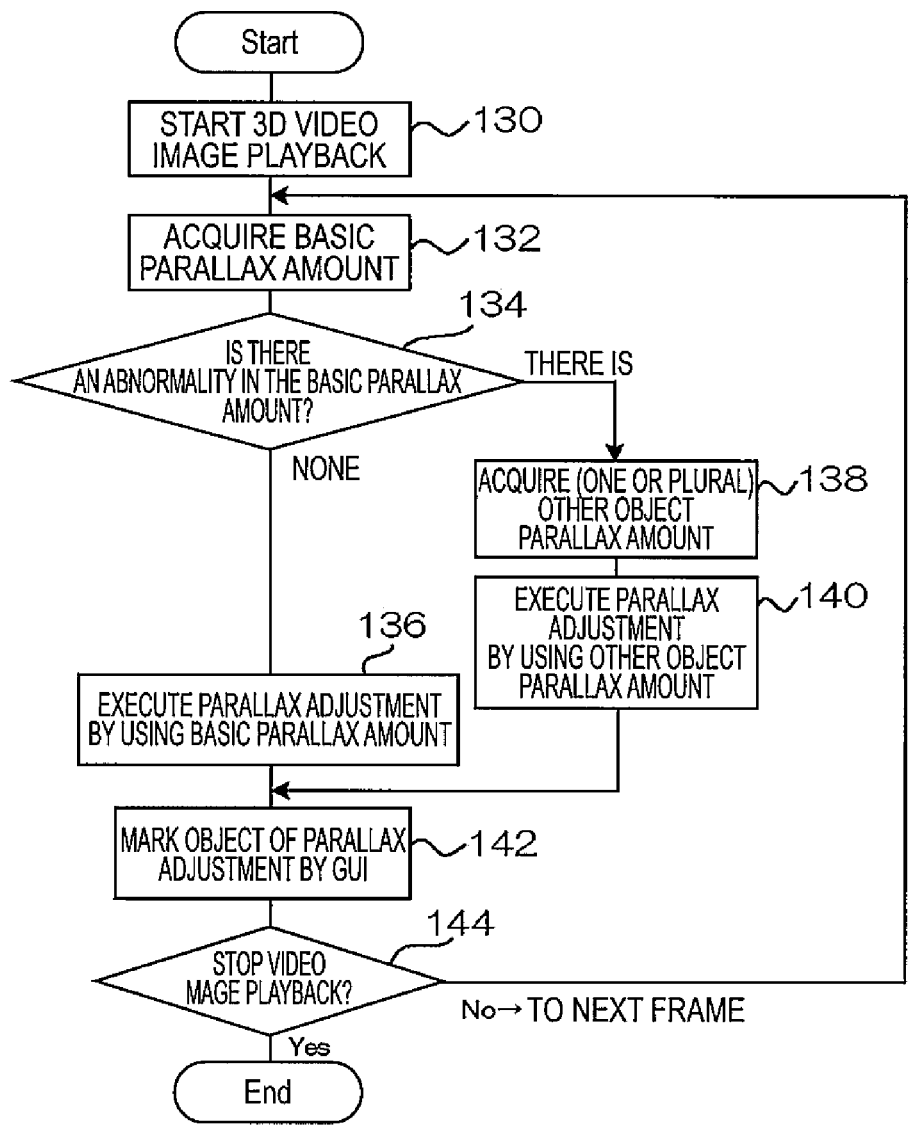
FIG. 11 is a flowchart showing a third parallax adjusting routine.

FIG. 11 is a flowchart showing the third parallax adjusting routine.

In step 130, when an instruction to start video image playback is inputted via the playback start button 12C, the CPU 32 starts three-dimensional video image playback, and proceeds to step 132.

In step 132, the CPU 32 causes the three-dimensional processing section 28 to acquire a basic parallax amount that is based on the images G1, G2 for the left eye and the right eye of the image file F0 stored in the recording medium 34, and proceeds to step 134. Here, the basic parallax amount means the parallax amount of a default object, and means the parallax amount of, for example, the object that is nearest to the center of the screen.

In step 134, the CPU 32 judges whether or not there is an abnormality in the basic parallax amount acquired at the three-dimensional processing section 28. Here, the same processing as step 104 shown in FIG. 5 is executed. Then, when there is an abnormality in the basic parallax amount, the routine proceeds to step 138. When there is no abnormality, the routine proceeds to step 136.

In step 136, the CPU 32 controls the three-dimensional processing section 28 to execute parallax adjustment by using the basic parallax amount, and proceeds to step 142. In accordance with the present step 136, the three-dimensional processing section 28 carries out parallax adjustment by using the basic parallax amount of the images G1, G2 for the left eye and the right eye, and outputs the images G1, G2 for the left eye and the right eye, whose parallax has been adjusted, to the display control section 30.

On the other hand, in step 138, the CPU 32 causes the three-dimensional processing section 28 to acquire the parallax amount of another object, and proceeds to step 138. For example, the face of a person other than the default object, or the like, corresponds to the other object.

In step 140, the three-dimensional processing section 28 is controlled so as to execute parallax adjustment by using the parallax amount of the other object. At this time, the three-dimensional processing section 28 selects, as the "other object", an "object that is near to the default object in the Z direction", or an "object that is near to the default object in the two-dimensional coordinate", and carries out parallax adjustment by using the parallax amount of the selected object, and outputs the object, whose parallax has been adjusted, to the display control section 30. Here, the same plane as the images G1, G2 for the left eye and the right eye of the image file F0 stored in the recording medium 34 is expressed by a two-dimensional coordinate (X, Y), and the direction orthogonal to this plane (the baseline) is the Z direction.

Accordingly, although it does not matter whether or not the "object that is near to the default object in the Z direction" is near in the two-dimensional coordinate, it is the object whose stereoscopic feel is nearest to the default object. Therefore, due to the three-dimensional processing section 28 carrying out parallax adjustment by using the parallax amount of that object, the three-dimensional processing section 28 can suppress sudden changes in the parallax amount, and as a result, can stably carry out parallax adjustment.

Further, although it does not matter whether or not the "object that is near to the default object in the two-dimensional coordinate" is near to the stereoscopic feel of the default object, it is the object that is closest to the default object in the two-dimensional coordinate. Therefore, due to the three-dimensional processing section 28 carrying out parallax adjustment by using the parallax amount of that object, the three-dimensional processing section 28 can carry out parallax adjustment by using an object that is close to the object of parallax adjustment until now, and as a result, can stably carry out parallax adjustment. Then, the routine proceeds to step 142 via the above-described processings.

Figure 12A:
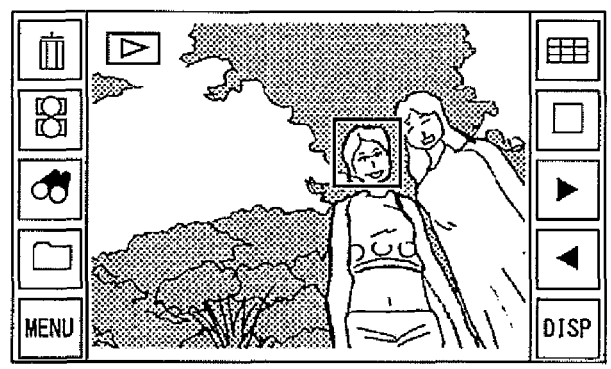
FIG. 12A is a drawing showing a state in which an object of parallax adjustment is marked by a GUI.
Figure 12B:
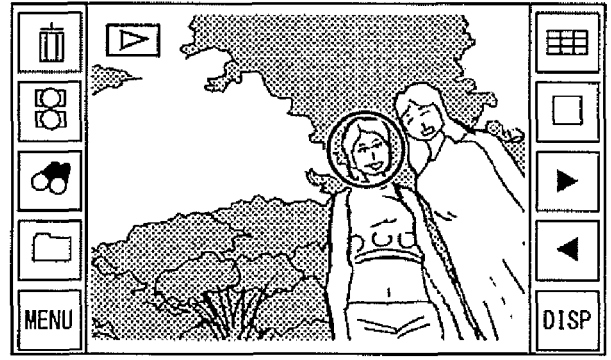
FIG. 12B is a drawing showing a state in which the object of parallax adjustment is marked by a GUI.
Figure 12C:
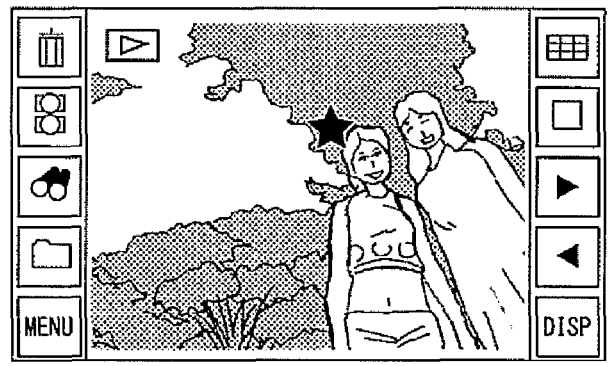
FIG. 12C is a drawing showing a state in which the object of parallax adjustment is marked by a GUI.

In step 142, the CPU 32 marks the object of parallax adjustment by a GUI (Graphical User Interface) and causes the monitor 7 to display it, and proceeds to step 144. Here, the face of the person that is the object of parallax adjustment may be, for example, surrounded by a square as shown in FIG. 12A, or surrounded by a circle as shown in FIG. 12B, or a star-shaped mark may be applied thereto as shown in FIG. 12C.

In step 144, the CPU 32 judges whether an instruction to stop video image playback has been inputted from the playback stop button 12D. When the judgment is affirmative, the CPU 32 ends the present routine. When the judgment is negative, the CPU 32 shifts to processing to the next frame, and again returns to step 132.

As described above, even when there is an abnormality in the basic parallax amount of the default object or when the default object has been lost track of, the playback device of the second embodiment carries out parallax adjustment after switching the object of parallax adjustment to another object. Therefore, parallax adjustment of three-dimensional video image playback can be stabilized.

Third Embodiment

Figure 13:
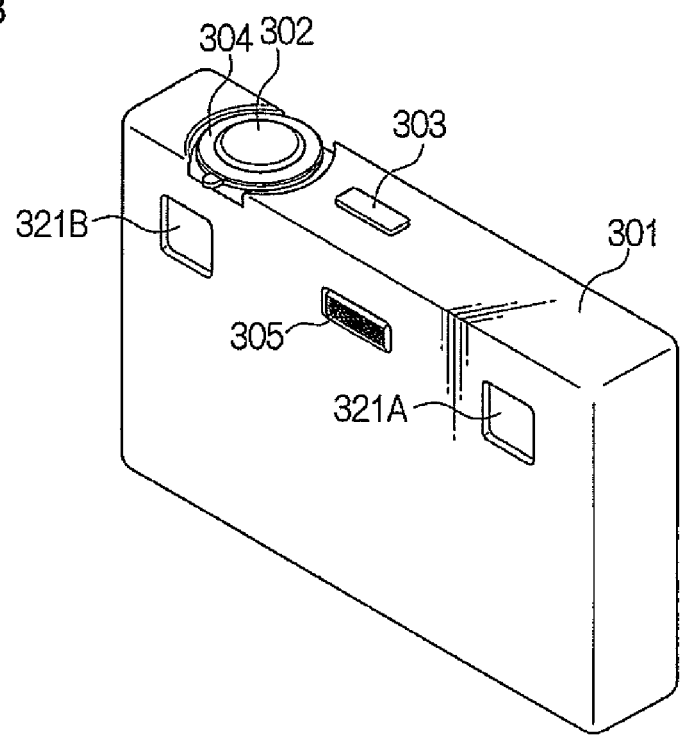
FIG. 13 is a front perspective view of a compound-eye camera.
Figure 14:
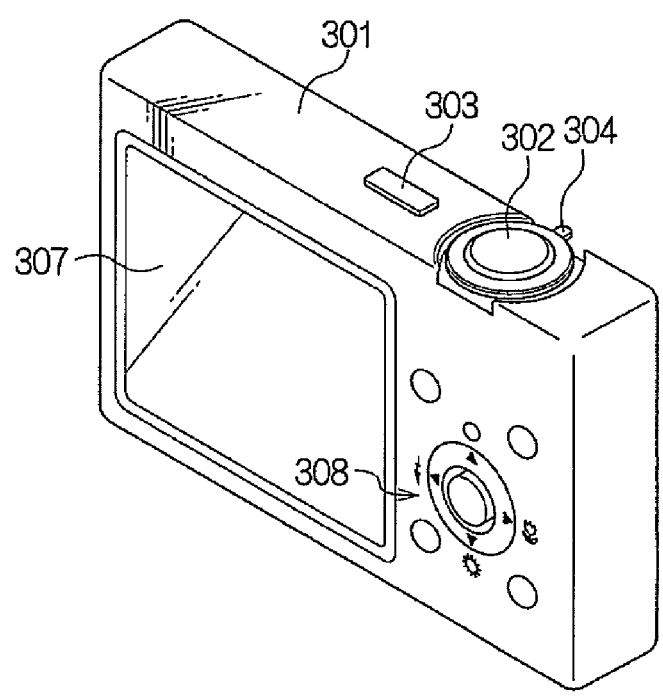
FIG. 14 is a rear perspective view of the compound-eye camera.

A third embodiment of the present invention is described next with reference to the drawings. FIG. 13 is a front perspective view of a compound-eye camera 301 relating to an embodiment of the present invention, and FIG. 14 is a rear perspective view.

A release button 302, a power button 303 and a zoom lever 304 are provided at the top portion of the compound-eye camera 301. A flash 305 and the lenses of two imaging sections 321A, 321B are disposed at the front surface of the compound-eye camera 301. Further, a liquid crystal monitor (hereinafter simply called "monitor") 307 that carries out various types of display, and various types of operation buttons 308, that include buttons functioning also as the playback start button 12C and the playback stop button 12D described in the first and second embodiments, are disposed at the rear surface of the compound-eye camera 301.

Figure 15:
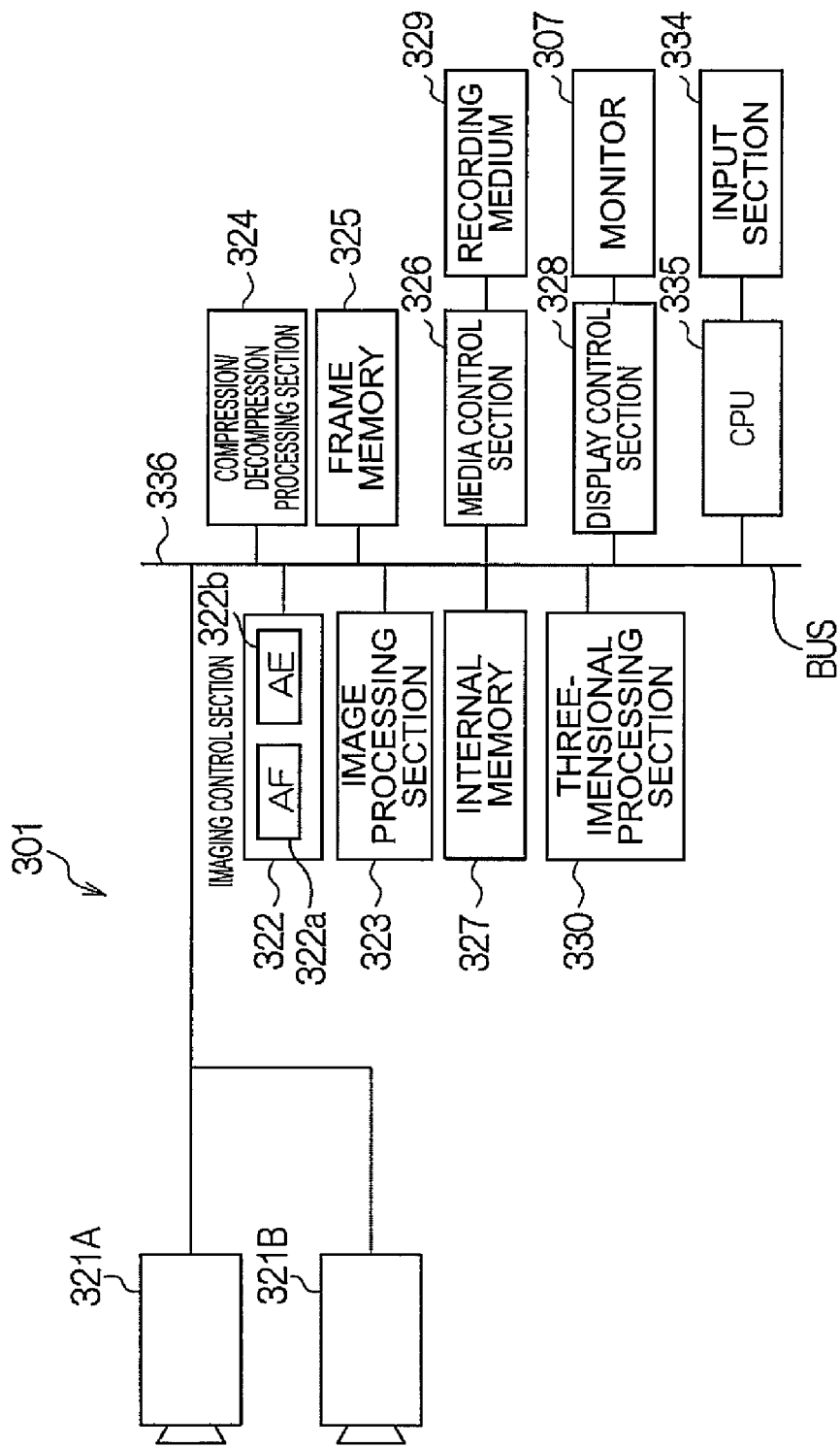
FIG. 15 is a schematic block diagram showing the internal structure of the compound-eye camera.

FIG. 15 is a schematic block diagram showing the internal structure of the compound-eye camera 301. The compound-eye camera 301 has the two imaging sections 321A, 321B, an imaging control section 322, an image processing section 323, a compression/decompression processing section 324, a frame memory 325, a media control section 326, an internal memory 327, a display control section 328, and a CPU 335, and these are connected to one another via the bus BUS. Further, a recording medium 329 is connected to the media control section 326, and the monitor 307 is connected to the display control section 328, respectively. Moreover, an input section 334, that is structured to include the release button 302, the power button 303, the zoom lever 304 and the operation buttons 308, is connected to the CPU 32. Note that the imaging sections 321A, 321B are disposed at a convergence angle at which the subject is viewed, such that there is a predetermined baseline length. Further, the information of the convergence angle and the baseline length is stored in the internal memory 327.

Figure 16:
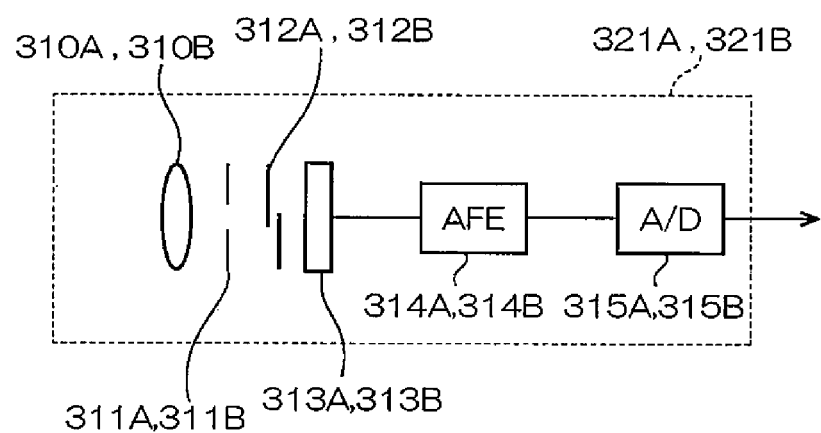
FIG. 16 is a diagram showing the structure of an imaging section.

FIG. 16 is a drawing showing the structure of the imaging sections 321A, 321B. As shown in FIG. 16, the imaging section 321A, 321B has a lens 310A, 310B, a diaphragm 311A, 311B, a shutter 312A, 312B, an image pickup element 313A, 313B, an analog front end (AFE) 314A, 314B, and an A/D converting section 315A, 315B, respectively.

The lens 310A, 310B has plural function-specific lenses, such as a focus lens for focusing on the subject, a zoom lens for realizing the zoom function, and the like. The position of the lens 310A, 310B is adjusted by an unillustrated lens driving section on the basis of focus data obtained from an AF processing section 322a of the imaging control section 322, and zoom data that is obtained when the zoom lever 304 shown in FIG. 13 and FIG. 14 is operated.

With respect to the diaphragm 311A, 311B, adjustment of the diaphragm diameter is carried out by an unillustrated diaphragm driving section on the basis of diaphragm value data obtained by an AE processing section 322b of the imaging control section 322.

The shutter 312A, 312B is a mechanical shutter, and is driven by an unillustrated shutter driving section in accordance with a shutter speed obtained from the AE processing section 322b.

The image pickup element 313A, 313B has a photoelectric surface at which numerous light-receiving elements are arrayed two-dimensionally. The subject light is imaged on this photoelectric surface and photoelectrically converted, and analog imaging signals are acquired. Further, a color filter, in which filters of the respective colors of R, G, B are arrayed orderly, is disposed at the front surface of the image pickup element 313A, 313B.

The AFE 314A, 314B carries out, on the analog imaging signals outputted from the image pickup element 313A, 313B, processing that removes noise of the analog imaging signals, and processing that adjusts the gain of the analog imaging signals (hereinafter called "analog processings").

The A/D converting section 315A, 315B converts, into digital signals, the analog imaging signals that were subjected to the analog processings by the AFE 314A, 314B. Note that the image expressed by the digital image data acquired from the imaging section 321A is the image G1 for the left eye, and the image expressed by the image data acquired from the imaging section 321B is the image G2 for the right eye.

As described above, the imaging control section 322 has the AF processing section 322a and the AE processing section 322b. When the release button 302 is halfway push-operated, the AF processing section 322a acquires ranging information from a ranging sensor, and determines the focal point positions of the lenses 10A, 10B, and outputs them to the imaging sections 321A, 321B. The AE processing section 322b determines the diaphragm value and the shutter speed on the basis of a pre-image, and outputs them to the imaging sections 321A, 321B.

Note that the method of detecting the focal point positions by the AF processing section 322a is not limited to an active method using ranging information, and a passive method that detects the focus positions by using the contrasts of the images may be used.

The imaging control section 322 controls the imaging sections 321A, 321B such that, in the state in which the release button 302 is not operated, through-images, that have fewer pixels than the actual images of the images G1, G2 for the left eye and the right eye and are for confirming the imaging range, are successively generated at a predetermined time interval (e.g., an interval of 1/30 second). Then, when the release button 302 is fully press-operated, the imaging control section 322 controls the imaging sections 321A, 321B to generate the actual images of the images G1, G2 for the left eye and the right eye in order to start the actual imaging.

The above explanation is the case of a static image mode, but, in the present third embodiment, setting to a video imaging mode is also possible. In the case of the video imaging mode, when the release button 302 is pushed, video imaging is started, and the images G1, G2 for the left eye and the right eye are generated per frame, and, when the release button 302 is pressed again, the video imaging stops.

The image processing section 323 carries out image processings such as white balance adjustment, gradation correction, sharpness correction, and color correction and the like on the digital image data of the images G1, G2 for the left eye and the right eye that the imaging sections 321A, 321B have acquired.

The compression/decompression processing section 324 carries out compression processing in a compression format such as, for example, JPEG or the like, on the image data expressing the actual images of the images G1, G2 for the left eye and the right eye that have been subjected to processing by the image processing section 323, and generates the image file F0 for stereoscopic viewing. This image file F0 for stereoscopic viewing has the image data of the images G1, G2 for the left eye and the right eye, and further includes accessory information that is based on Exif format or the like, such as the baseline length, the convergence angle, the image capturing date and time and the like, and viewpoint information expressing the viewpoint positions.

The frame memory 325 is a memory for work that is used when carrying out various types of processings, including the processings that the aforementioned image processing section 323 carries out, on the image data expressing the images G1, G2 for the left eye and the right eye that the imaging sections 321A, 321B acquired.

The media control section 326 carries out control of accessing the recording medium 329 and writing and reading image files and the like.

The internal memory 327 stores various types of constants that are set at the compound-eye camera 301, and programs that the CPU 335 executes, and the like.

In the case of stereoscopic viewing, the display control section 328 displays, on the monitor 307, the stereoscopic image GR that is recorded in the frame memory 325 or the recording medium 329.

Figure 17:
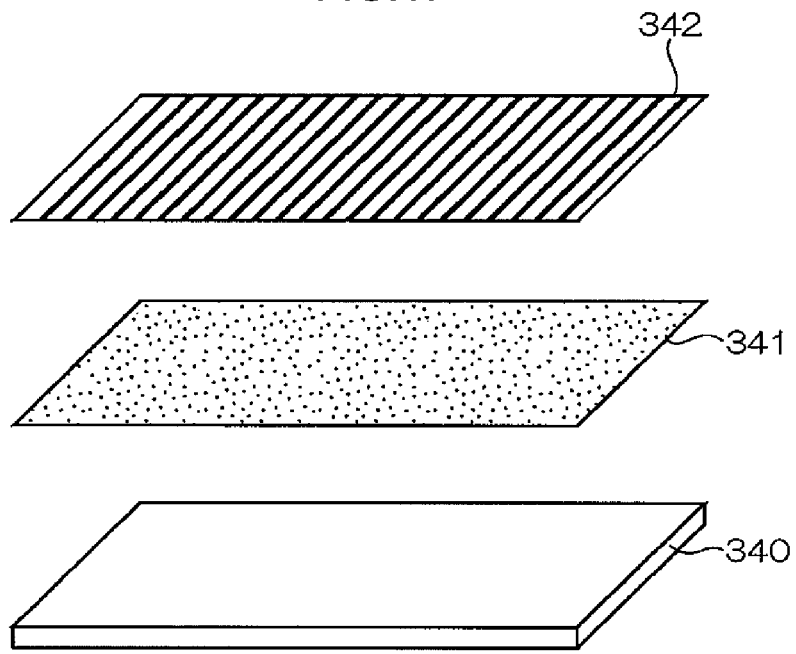
FIG. 17 is a drawing showing the structure of a monitor.

FIG. 17 is an exploded perspective view showing the structure of the monitor 307. As shown in FIG. 17, the monitor 307 is structured by layering a backlight unit 340, that emits light from LEDs, and a liquid crystal panel 341, that is for carrying out various types of display, and mounting a lenticular sheet 342 to the obverse of the liquid crystal panel 341.

Figure 18:
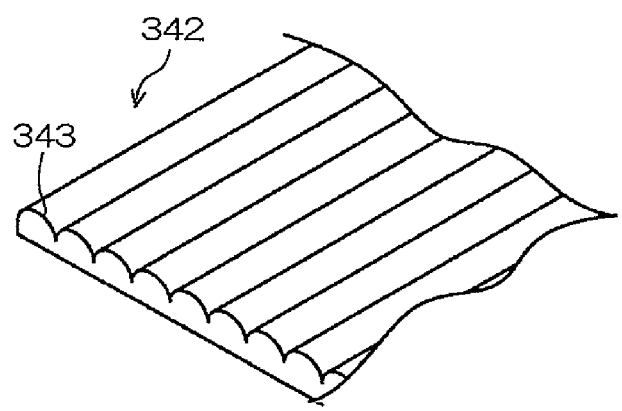
FIG. 18 is a drawing showing the structure of a lenticular sheet.

FIG. 18 is a drawing showing the structure of the lenticular sheet. As shown in FIG. 18, the lenticular sheet 342 is structured by lining-up plural cylindrical lenses 343 in parallel in a direction running along the baseline.

Further, the compound-eye camera 301 has a three-dimensional processing section 330. In order to stereoscopically display the images G1, G2 for the left eye and the right eye on the monitor 307, the three-dimensional processing section 330 carries out three-dimensional processing on the images G1, G2 for the left eye and the right eye, and generates the stereoscopic image GR.

Figure 19:
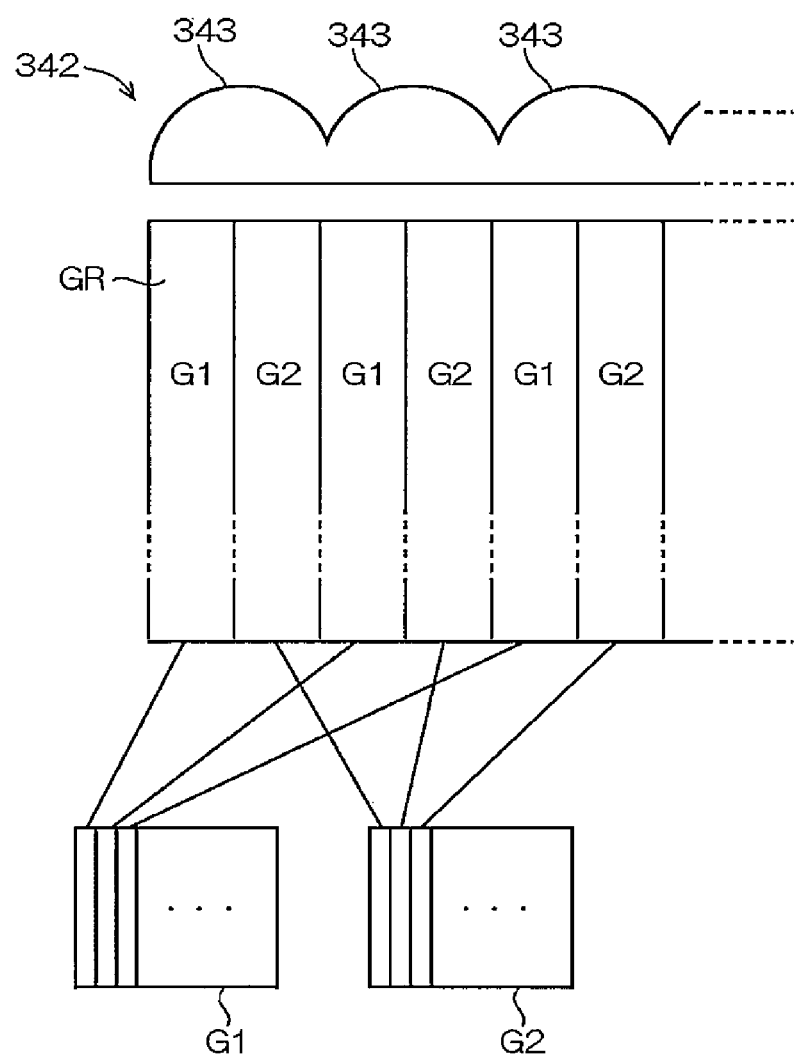
FIG. 19 is a diagram for explaining three-dimensional processing with respect images for a left eye and for a right eye.

FIG. 19 is a diagram for explaining three-dimensional processing with respect to the images G1, G2 for the left eye and the right eye. As shown in FIG. 19, the three-dimensional processing section 330 carries out the three-dimensional processing of cutting the images G1, G2 for the left eye and the right eye out respectively in strip shapes in the direction perpendicular to the baseline, and alternately disposing, at the respective cylindrical lenses 343 at the lenticular sheet 342, the images G1, G2 for the left eye and the right eye, that have been cut-out in strip shapes and whose positions correspond, and generates the stereoscopic image GR. The image pairs of the images G1, G2 for the left eye and the right eye that structure the stereoscopic image GR are each disposed so as to correspond to one cylindrical lens.

Further, the three-dimensional processing section 330 can also adjust the parallax of the images G1, G2 for the left eye and the right eye. Here, parallax means the offset amount in the pixel position in the lateral direction of the images G1, G2 for the left eye and the right eye, i.e., the direction along the baseline, of a subject that is included in both of the images G1, G2 for the left eye and the right eye. By adjusting the parallax, the stereoscopic feel of the subject that is included in the stereoscopic image GR can be made to be an appropriate feel.

Moreover, the three-dimensional processing section 330 may adjust in real time the parallax of the images G1, G2 for the left eye and the right eye obtained at the imaging sections 321A, 321B, or may adjust the parallax of the images G1, G2 for the left eye and the right eye that are recorded in advance on the recording medium 329.

In the compound-eye camera 301 that is structured as described above, the first or second parallax adjusting routine that was described in the first embodiment, or the third parallax adjusting routine that was described in the second embodiment, is executed. Note that the programs for the left eye and of the second parallax adjusting routine are stored in advance in the internal memory 327.

Note that the present invention is not limited to the above-described embodiments, and can also be applied to structures whose design has been changed within the scope of the matter recited in the claims.

For example, in the above-described first and second embodiments, parallax related information, such as shown in FIG. 20 as an example, may be acquired instead of directly acquiring the parallax amount.

Figure 21A:
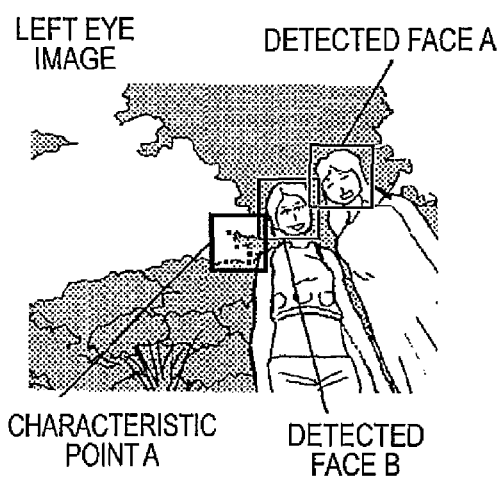
FIG. 21A is a drawing for explaining parallax related information.
Figure 21B:
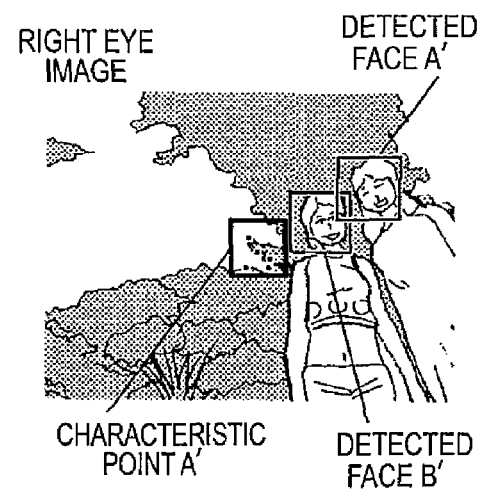
FIG. 21B is a drawing for explaining parallax related information.

FIG. 21A and FIG. 21B are drawings for explaining the parallax related information. Information such as the coordinate group of a characteristic point A, the coordinate group of a characteristic face A, the coordinate group of a characteristic face B, the absence/presence of hunting, for the left eye image (the image G1 for the left eye) and the right eye image (the image G2 for the right eye) of each frame, correspond to the parallax related information. Then, parallax adjustment may be carried out by using these parallax related information.

Further, the above first and second embodiments describe examples of cases in which the user is made to view the stereoscopic image by using the liquid crystal shutter glasses 14, and the above third embodiment describes an example of a case in which the user is made to view the stereoscopic image by using the lenticular sheet 42, but the present invention is not limited to the same. For example, the lenticular sheet 42 may be applied to the monitor 12A of the display device 12 described in the above first and second embodiments, and, by generating the stereoscopic image GR as described in the above third embodiment and displaying the stereoscopic image GR on the monitor 12A, the user can be made to view the stereoscopic image without using the liquid crystal shutter glasses 14. Or, instead of providing the lenticular sheet 42 at the monitor 307 of the compound-eye camera 301 described in the above third embodiment, the image G1 for the left eye and the image G2 for the right eye may be displayed alternately on the monitor 307, and the user may be made to view the stereoscopic image by using the liquid crystal shutter glasses 14 as described in the above first and second embodiments.

Further, although the above respective embodiments describe examples of acquiring the parallax amount on the basis of the face region of the same person, the present invention is not limited to the same. For example, the face region of a pet such as a dog or a cat or the like, or the contour of a characteristic portion of a specific animal or plant, or the contour of a characteristic portion of an object other than a living being (e.g., an automobile, a train, a building or the like) may be applied as the object of acquisition of the parallax amount. In this case, the example can be given of a form in which an image dictionary for pattern matching, in which are stored characteristic amount data expressing the characteristics of images of objects of acquisition, is stored in advance, and an object of acquisition is specified by using this image dictionary, and the parallax amount of the specified object of acquisition is computed. Note that the image dictionary is preferably a dictionary of a form that is customized by the user. In this case, the example can be given of an image dictionary, that is such that a user can additionally register into the image dictionary of characteristic amount data expressing characteristics of images showing objects that are designated as objects of acquisition of the parallax amount, and is such that the user can delete from this image dictionary.

Further, the object of acquisition of the parallax amount may be a subject that is based on a region (a closed curve region) that is surrounded by a closed curve that is prescribed by a spatial frequency (edge component) of a predetermined value per frame, or may be a subject that is based on a closed curve region that is prescribed by the spatial frequency of a spatial frequency (a predetermined value) that exceeds a predetermined spatial frequency per frame. Note that this subject may be the closed curve region itself that is prescribed by a spatial frequency that is greater than or equal to a predetermined spatial frequency within the frame, or may be a region within a geometric shape such as the smallest rectangle or smallest circle or the like that surrounds a closed curve region that is prescribed by a spatial frequency of a predetermined value, or may be a region that is obtained by deforming a closed curve region in accordance with a predetermined algorithm. In this way, the object of acquisition of the parallax amount may be any object provided that it is a predetermined subject per frame.

Note that the disclosure of Japanese Patent Application (Patent Application No. 2010-149859) in its entirety is incorporated by reference in the present Description.

Further, all of the documents, patent applications and technical standards described in the present Description are incorporated by reference into the present Description to the same extent as if the individual document, patent application or technical standard was concretely and individually indicated to be incorporated by reference.

What is claimed is:

1. A playback device comprising:
   an input section that inputs continuous frame images of a plurality of viewpoints in which a same subject has been picked-up in continuous frames from a plurality of viewpoints;
   a parallax amount acquiring section that acquires a parallax amount of a predetermined object on the basis of a frame image for a left eye and a frame image for a right eye that structure the continuous frame images inputted by the input section;
   an abnormality judging section that judges, with respect to each pair of frame images that is a pair of the frame image for the left eye and the frame image for the right eye, that there is an abnormality in the parallax amount in a case in which an object of acquisition of the parallax amount can no longer be detected from the frame image for the left eye and the frame image for the right eye;
   a parallax adjusting section that, when it is judged by the abnormality judging section that there is no abnormality in the parallax amount, with respect to the each pair of frame images, carries out parallax adjustment of the predetermined object, and that, when it is judged by the abnormality judging section that there is an abnormality in the parallax amount, with respect to the each pair of frame images, carries out parallax adjustment with respect to another object that is different than the predetermined object, and that, when it is judged by the abnormality judging section that there is an abnormality in the parallax amount, the parallax adjusting section lowers a parallax adjustment frequency; and
   an output section that, when it is judged by the abnormality judging section that there is no abnormality in the parallax amount, outputs the frame image for the left eye and the frame image for the right eye that include the predetermined object on which parallax adjustment has been carried out by the parallax adjusting section, and that, when it is judged by the abnormality judging section that there is an abnormality in the parallax amount, outputs the frame image for the left eye and the frame image for the right eye that include the other object on which parallax adjustment has been carried out by the parallax adjusting section.

2. The playback device of claim 1, wherein the parallax adjusting section makes an object, that has a closest distance to the predetermined object in a direction orthogonal to an image plane of the frame image for the left eye and the frame image for the right eye, be the other object.

3. The playback device of claim 1, wherein the parallax adjusting section makes an object, that has a closest distance to the predetermined object in an image plane of the frame image for the left eye and the frame image for the right eye, be the other object.

4. The playback device of claim 1, wherein at least one of the predetermined object or the other object is a subject image that is based on a closed curve region prescribed by a spatial frequency of a predetermined value within the frame image for the left eye and the frame image for the right eye.

5. The playback device of claim 1, further comprising a display section that displays the frame images, that are outputted by the output section, such that the frame image for the left eye and the frame image for the right eye are viewed as a stereoscopic image.

6. A compound-eye image pickup device, comprising:
   the playback device of claim 1; and
   an image pickup section that generates the continuous frame images by picking-up a same subject from a plurality of viewpoints in continuous frames.

7. A playback method comprising:
   inputting continuous frame images of a plurality of viewpoints in which a same subject has been picked-up in continuous frames from a plurality of viewpoints;
   acquiring a parallax amount of a predetermined object on the basis of a frame image for a left eye and a frame image for a right eye that structure the inputted continuous frame images;
   judging, with respect to each pair of frame images that is a pair of the frame image for the left eye and the frame image for the right eye, that there is an abnormality in the parallax amount in a case in which an object of acquisition of the parallax amount can no longer be detected from the frame image for the left eye and the frame image for the right eye;
   when it is judged that there is no abnormality in the parallax amount, with respect to the each pair of frame image, carrying out parallax adjustment of the predetermined object, and, when it is judged that there is an abnormality in the parallax amount, with respect to the each pair of frame image, carrying out parallax adjustment with respect to another object that is different than the predetermined object, and that, when it is judged that there is an abnormality in the parallax amount, carrying out parallax adjustment by lowering a parallax adjustment frequency; and when it is judged that there is no abnormality in the parallax amount, outputting the frame image for the left eye and the frame image for the right eye that include the predetermined object on which the parallax adjustment has been carried out, and, when it is judged that there is an abnormality in the parallax amount, outputting the frame image for the left eye and the frame image for the right eye that include the other object on which the parallax adjustment has been carried out.

8. A non-transitory computer readable medium storing a program for causing a computer to function as:
an input section that inputs continuous frame images of a plurality of viewpoints in which a same subject has been picked-up in continuous frames from a plurality of viewpoints;
a parallax amount acquiring section that acquires a parallax amount of a predetermined object on the basis of a frame image for a left eye and a frame image for a right eye that structure the continuous frame images inputted by the input section;
an abnormality judging section that judges, with respect to each pair of frame images that is a pair of the frame image for the left eye and the frame image for the right eye, that there is an abnormality in the parallax amount in a case in which an object of acquisition of the parallax amount can no longer be detected from the frame image for the left eye and the frame image for the right eye;
a parallax adjusting section that, when it is judged by the abnormality judging section that there is no abnormality in the parallax amount, with respect to the each pair of frame image, carries out parallax adjustment of the predetermined object, and that, when it is judged by the abnormality judging section that there is an abnormality in the parallax amount, with respect to the each pair of frame image, carries out parallax adjustment with respect to another object that is different than the predetermined object, and that, when it is judged that there is an abnormality in the parallax amount, carrying out parallax adjustment by lowering a parallax adjustment frequency; and
an output section that, when it is judged by the abnormality judging section that there is no abnormality in the parallax amount, outputs the frame image for the left eye and the frame image for the right eye that include the predetermined object on which parallax adjustment has been carried out by the parallax adjusting section, and that, when it is judged by the abnormality judging section that there is an abnormality in the parallax amount, outputs the frame image for the left eye and the frame image for the right eye that include the other object on which parallax adjustment has been carried out by the parallax adjusting section.

* * * * *